United States Patent
Parks

(12)
(10) Patent No.: US 6,629,773 B2
(45) Date of Patent: Oct. 7, 2003

(54) METHOD AND APPARATUS FOR GAS INDUCED MIXING AND BLENDING OF FLUIDS AND OTHER MATERIALS

(76) Inventor: Richard E. Parks, 9207 NE. 24th, Bellevue, WA (US) 98004

(*) Notice: Subject to any disclaimer, the term of this patent is extended or adjusted under 35 U.S.C. 154(b) by 0 days.

(21) Appl. No.: 09/850,703

(22) Filed: May 7, 2001

(65) Prior Publication Data

US 2002/0163854 A1 Nov. 7, 2002

(51) Int. Cl.[7] ............................................... B01F 13/02
(52) U.S. Cl. ................................................. 366/107
(58) Field of Search ............................... 366/107, 106, 366/101; 222/3, 195, 261

(56) References Cited

U.S. PATENT DOCUMENTS

| | | | | |
|---|---|---|---|---|
| 994,564 | A | * 6/1911 | Beauvais | 366/101 |
| 2,084,546 | A | * 6/1937 | Ahlmann | 366/106 |
| 2,171,398 | A | * 8/1939 | Hastert | 366/106 |
| 2,171,399 | A | * 8/1939 | Hastert | 366/106 |
| 2,791,404 | A | * 5/1957 | Kelly, Jr. et al. | 366/106 |
| 2,844,361 | A | * 7/1958 | Dilcher et al. | 366/106 |
| 3,003,752 | A | * 10/1961 | Frost | 366/106 |
| 3,386,182 | A | * 6/1968 | Lippert | 34/364 |
| 3,450,389 | A | * 6/1969 | McCurdy | 366/106 |
| 3,544,074 | A | * 12/1970 | Karpacheva | 366/106 |
| 3,582,046 | A | * 6/1971 | Mueller et al. | 366/106 |
| 3,608,866 | A | * 9/1971 | Karpacheva et al. | 366/106 |
| 3,722,836 | A | * 3/1973 | Savage et al. | 366/101 |
| 3,913,891 | A | 10/1975 | Steele | |
| 4,136,970 | A | * 1/1979 | Cabrera et al. | 366/101 |
| 4,496,076 | A | * 1/1985 | Tompkins | 366/106 |
| 4,534,914 | A | 8/1985 | Takahashi | |
| 4,595,296 | A | 6/1986 | Parks | 366/106 |
| 4,923,374 | A | * 5/1990 | Lundin et al. | 366/101 |
| 4,944,598 | A | 7/1990 | Steele | 366/106 |
| 5,564,825 | A | * 10/1996 | Burt | 366/175.2 |
| 5,762,418 | A | 6/1998 | Van Drie | 366/322 |

FOREIGN PATENT DOCUMENTS

| | | | | |
|---|---|---|---|---|
| DE | 1 245 912 | | 8/1967 | |
| DE | 19 11 412 | | 9/1970 | |
| DE | 30 04 223 | | 8/1981 | |
| GB | 442355 | * | 2/1936 | 366/101 |

OTHER PUBLICATIONS

PCT/US02/14319, PCT International Search Report, Jul. 24, 2002.

* cited by examiner

*Primary Examiner*—Tony G. Soohoo
(74) *Attorney, Agent, or Firm*—Graybeal Jackson Haley LLP

(57) ABSTRACT

An improved injector system including an injector operatively connected to a source of pressurized gas and mounted to an accumulator located in close proximity to the bottom of a tank containing a fluid or other materials. The injector comprises a chamber housing and a valve disposed in the chamber housing. The chamber housing is matable to an accumulator that defines an orifice, and receives pressurized gas from an external source. The valve engages the accumulator and selectively administers or obstructs the release of the gas into the tank as directed by an actuator contained within the chamber housing. In ambient environments that tend to foul and clog the chamber orifice or accumulator orifice, a removable orifice plate is used wherein the valve engages the orifice plate.

47 Claims, 9 Drawing Sheets

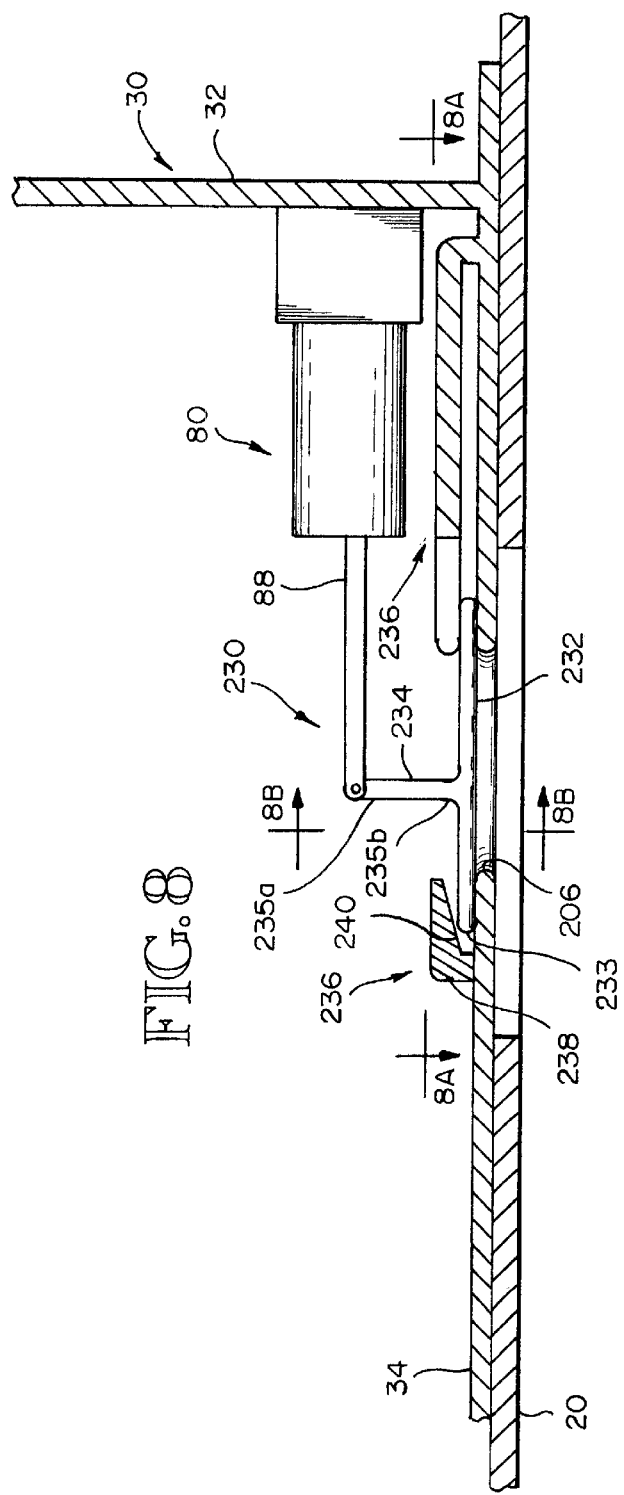
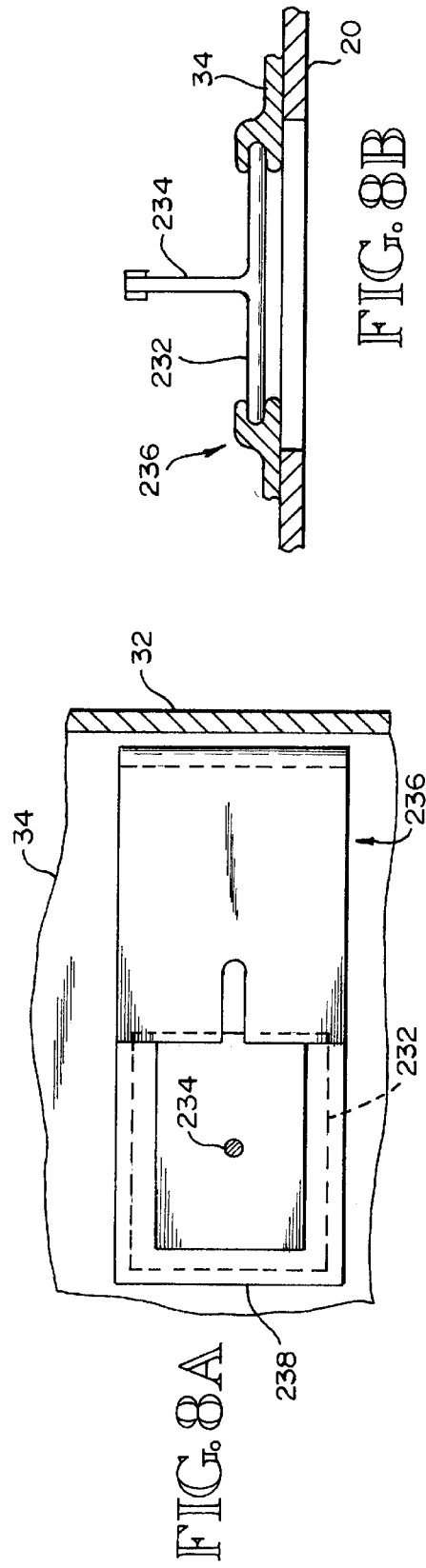
FIG. 8
FIG. 8A
FIG. 8B

METHOD AND APPARATUS FOR GAS INDUCED MIXING AND BLENDING OF FLUIDS AND OTHER MATERIALS

TECHNICAL FIELD

The invention relates to the field of non-mechanical mixing of fluids and other materials, and more particularly to an improved gas injection apparatus and method whereby contamination of an injector orifice is reduced and/or eliminated.

BACKGROUND OF THE INVENTION

On Jun. 17, 1986, U.S. Pat. No. 4,595,296 (the '296 patent) was issued to Richard Parks for novel methods and apparatuses for mixing and blending fluids using injected gas. This patent, which is incorporated herein by reference, disclosed an apparatus and methods that utilized compressed gas to achieve desired mixing and blending of fluids, slurries or the like rather than utilizing traditional mechanical means.

Because the actual mixing of the fluid, slurry or the like, according to the '296 patent, results from the ascension of a bubble from the bottom to the top of the fluid, slurry or the like in contrast to traditional mechanical mixers, a number of benefits are achieved. First, much lower maintenance costs are realized. With the injection inlet connected to a source of gas requiring a compressor and plenum to achieve and sustain an operable pressure, the only elements requiring any consistently routine maintenance is the compressor and the check valve. Furthermore, locating the compressor outside the holding tank eliminates any down time while the compressor is serviced. Similarly, with the injection inlet connected to a source of contained gas, the only element requiring any consistently routine maintenance is the check valve.

Second, much lower energy consumption is realized. With the injection inlet connected to a source of low pressure gas requiring a compressor and plenum to achieve and sustain an operable pressure, the compressor, which operates intermittently, does not consume an excessive amount of energy. In contrast, a motor coupled to a propeller or mixing blades, which operates throughout the duration of the mixing event, consumes much more energy.

Finally, quicker blending times are realized because the mixing and blending system is able to move more of the fluid, slurry or the like per increment of time by strategically combining many of the apparatuses into a system and strategically locating each apparatus through out the entire holding tank.

Since the inception of this technology, its acceptance in various industries has been wide-spread. As with most technologies, the passage of time permits one to identify aspects of the technology that could stand improvement.

One area that has garnered additional attention has been the use of the disclosed injector in hostile mixing and blending environments, namely environments wherein the mixing components are subject to accumulation or build-up of deposits that deleteriously interfere with the injection of gas into the medium. Such environments include wastewater and slurries where maintaining the suspension of a solid in a liquid environment is desired. An example of this is the suspension of iron oxide particles in a solution of dyes and solvents. Such environments might also include mixtures where maintaining the solution of two or more different liquids in a homogeneous liquid environment or maintaining the solution of a solid in a homogeneous liquid environment is desired. An example of this is the mixing of calcium carbonates, paper chests, lime bins or kayline clay.

A principle problem with the formation of deposits on the submerged portions of the apparatus is that the orifice in the accumulator begins to constrict, thereby limiting the volume of gas that is injected into the fluid or other materials during each pulse. As the expelled volume decreases, the rate of deposit formation increases, thereby compounding the problem. Naturally, if the gas injection was constant, the exposure of the orifice to the fluid or other materials would be nominal. However, a feature of the '296 injector relies upon the periodic delivery of pressurized gas. During the non-delivery intervals, fluid backwash can enter the orifice, thereby leading to deposit accumulation and orifice constriction.

SUMMARY OF THE INVENTION

The present injector comprises improved methods and apparatuses for introducing gas into a container to mix and blend fluids and other materials held in the container. The method comprises locating in the container one or more injectors with each injector having a chamber to hold pressurized gas, presenting pressurized gas to the one or more chambers through a port, establishing a conduit at a chamber orifice between the chamber and the fluid or other materials in the container to allow the pressurized gas to enter the fluid or other materials, and forming one or more bubbles in the fluid or other materials by opening the conduit to release the pressurized gas and then obstructing the conduit.

A basic configuration of the injector comprises: a fluid impervious chamber housing and a remotely operable valve. The chamber housing defines a chamber for receiving pressurized gas from an external source and a chamber orifice for releasing pressurized gas. The remotely operable valve are disposed in the chamber and operate to selectively open and close the chamber orifice, thereby modulating the release of pressurized gas from the chamber into the fluid or other materials held in the container, hereafter referred to as the ambient environment. Furthermore, the chamber housing is matable to an accumulator, and the chamber is in fluid communication with an external source of pressurized gas so that the chamber contains pressurized gas at all times during operation of the injector.

In a preferred embodiment, the injector further comprises an actuator comprising a ram operatively linked to the valve. The actuator is operatively linked to a controller located outside the holding tank and either extends or retracts the ram thereby closing or opening, respectively, the valve. The actuator can be electrically, pneumatically or hydraulically operated. The controller can consist of a compressor, a plenum, a regulator and a flow control valve; or it can consist of a reservoir, a pump and a flow control valve; or it can simply consist of a tank of compressed gas, a regulator and a flow control valve. The controller can also consist of a battery or an electric potential source and a switch. With the controller, the valve can be controlled precisely.

in addition, a spring preferably assists the controller in extending the ram. The spring provides a fail-close position so that in the event of a loss of the controller activity the valve will naturally close thereby preventing the ambient environment from entering the chamber.

Furthermore, in a preferred embodiment, the chamber housing is formed from a section of cylindrical pipe sealingly welded to a base at a first end wherein the base has a chamber orifice preferably coaxial with an orifice through an accumulator when removably attached thereto. A cap is removably attached to a second end to form a cylindrical chamber. Contained within this housing is the valve and an actuator as previously described. The cap has at least one port for receiving pressurized gas, and preferably has three ports; a main port and two actuator control ports to facilitate the use of pneumatic, hydraulic or electric controls to operate the actuator.

In the event that the environment wherein the injector operates is highly corrosive or wherein build-up on the orifice is of great concern, an orifice plate defining an aperture can be attached at the chamber orifice of the chamber housing. The orifice plate can be removably attached to the base of the chamber housing or the accumulator. When the orifice plate is installed, the valve engages it instead of the accumulator orifice or the chamber orifice. In this manner, if the aperture becomes fouled or constricted, it is only required that this orifice plate be replaced rather than the accumulator or base. If the orifice plate is attached to the base of the chamber housing removal of the accumulator to replace or clean the orifice plate is not necessary; one need only remove the chamber housing from the accumulator plate.

In another embodiment, the actuator is not directly linked to a controller, but rather is controlled by the difference between the pressure in the environment within the chamber and the pressure in the ambient environment. To accomplish this, the actuator comprises a pressure responsive member operatively linked to the valve and having one surface exposed to the ambient environment and an opposite surface exposed to the pressurized gas in the chamber. The pressure responsive member moves as directed by the pressure difference on these surfaces while maintaining a barrier between the pressurized gas in the chamber and the ambient environment. To maintain a gas pressure inside the chamber that is greater than the ambient environment throughout the operation of the valve, the actuator is designed to operate when the pressure difference exceeds or drops below a predetermined pressure difference. That is, when the predetermined pressure difference is exceeded, the pressure responsive member moves in one direction causing the valve to open thereby releasing the pressurized gas through the chamber orifice. Likewise, when the pressure difference drops below the predetermined pressure difference, the pressure responsive member moves in the opposite direction causing the valve to close. To establish the predetermined pressure difference, a spring bias may or may not be utilized.

In yet another embodiment, the valve comprises a ball having a passage. The ball slidingly engages either the base of the chamber housing, the accumulator or the orifice plate, and is opened by rotating to establish fluid communication between the chamber and the ambient environment via the passage. The ball is rotated by the actuator and may or may not comprise a spring to bias the ball in a closed position.

In yet another embodiment, the valve comprises a swing gate positioned at the chamber orifice and pivotally attached to the chamber housing. An actuator, operatively linked to the swing gate, opens and closes the gate by pivoting the gate about an axis of rotation. In the closed position the swing gate engages either the base, the accumulator or the orifice plate.

In still another embodiment, the valve comprises a slide gate positioned at the chamber orifice and slidingly attached to the base of the chamber housing, the accumulator or the orifice plate. An actuator, operatively linked to the slide gate, opens and closes the valve by sliding the gate across the chamber orifice, accumulator orifice or aperture defined by the orifice plate depending on the element attached to the slide gate. In the closed position the slide gate sealingly engages the base of the chamber housing, the accumulator or the orifice plate.

These and other features of the invention are set forth below with reference to the several drawings.

BRIEF DESCRIPTION OF THE DRAWINGS

FIG. 8 is a partial, schematic, cross-sectional view of another embodiment of the injector showing a slide gate valve;

FIG. 8*a* is a schematic, plan view of the slide gate shown in FIG. 8 showing the gate and its retaining structure;

FIG. 8*b* is a schematic, cross-sectional view of the slide gate shown in FIG. 8 showing the gate and its retaining structure.

DETAILED DESCRIPTION OF THE INVENTION

Figure 1:
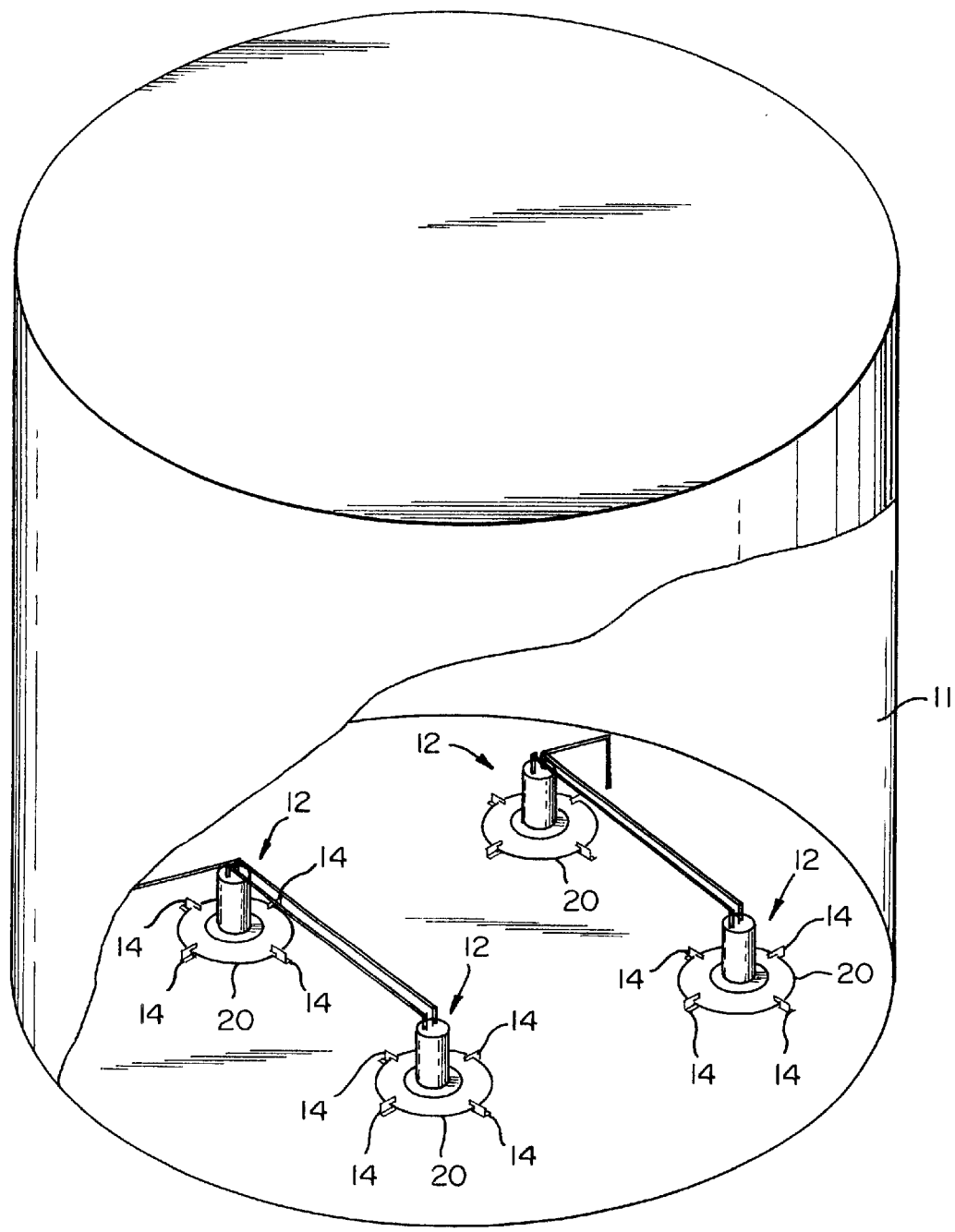
FIG. 1 is a perspective view of a holding tank with a partial cut-away of the holding tank illustrating four separate and identical embodiments of the injector installed in the holding tank.
Figure 2:
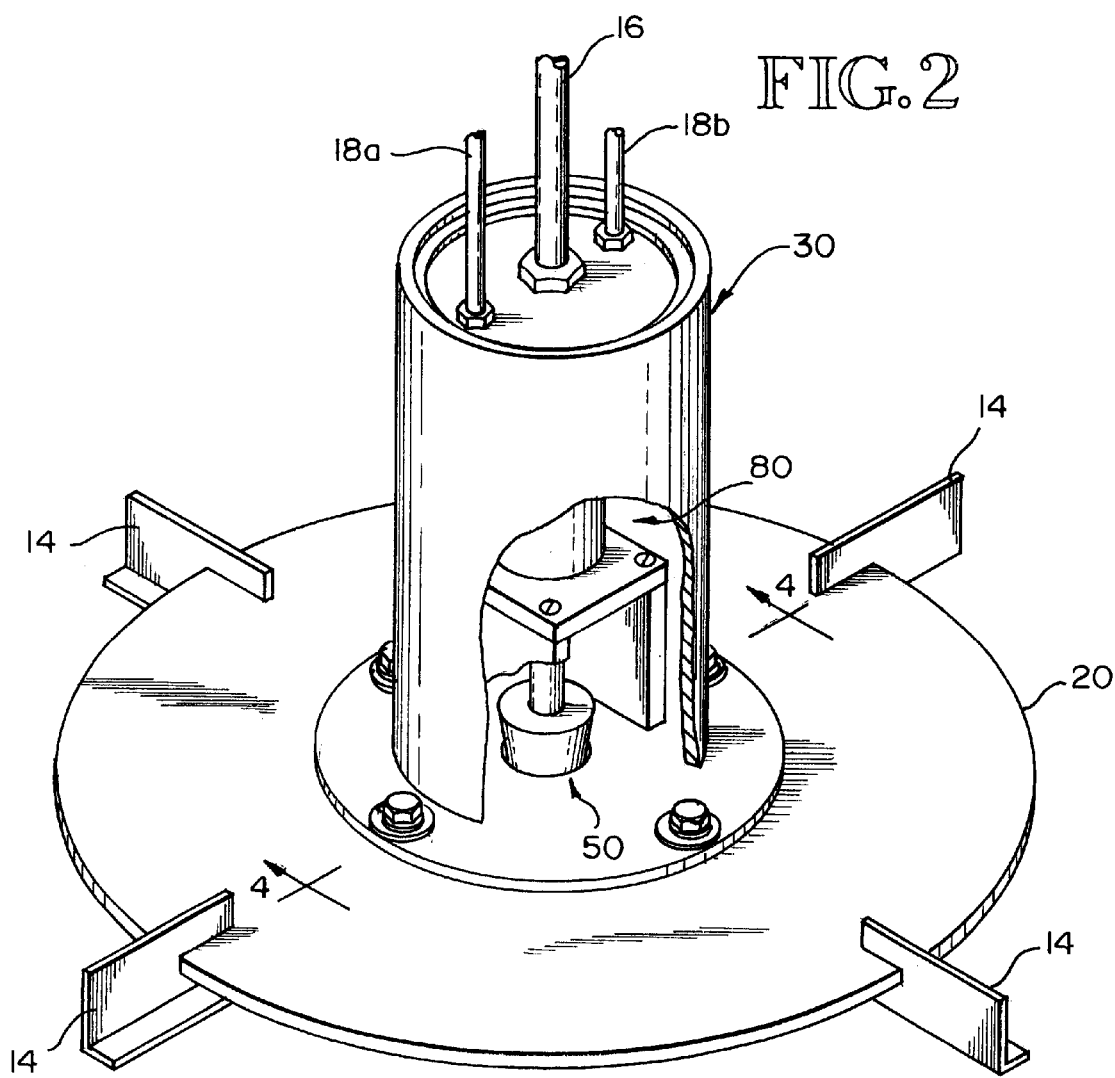
FIG. 2 is a perspective view of an embodiment of the injector with a partial cut-away of the chamber housing showing a valve directed by an actuator that is operated by two control lines.

Unless otherwise indicated, all structural components are formed from carbon steel, stainless steel, polyvinyl chloride or other compatible materials suitable for immersion into a holding tank. Turning now to the several Figures wherein like numerals indicate like parts, and more specifically to FIGS. 1, 2, 3 and 4, a preferred embodiment of the injector is shown as it would be found in a mixing tank application. Removably fixed to an accumulator (20) that is in turn positioned on the bottom of a holding tank (11) by a plurality of support plates (14), the injector (12) comprises a chamber housing (30), a plunger (50), an orifice plate (70) and an actuator (80). The support plates (14) stabilize the injector (12) and accumulator (20) from the buffeting effects of the fluid or other materials during mixing and, more importantly, establish a means of escape between the bottom of the holding tank (11) and the accumulator (20) whereby the bubble created by the injector can form and commence its ascent through the fluid or other materials.

Coupled to the chamber housing (30) is a pressurized gas line (16). Two control lines (18a, 18b) pass through the chamber housing (30) and are coupled to the actuator (80) disposed therein. Located outside of the holding tank (11) and fluidly connected to the chamber housing (30) by control lines (18a, 18b) is a controller directing a flow of pressurized fluid or gas. While it is more advantageous to locate the major components of this controller outside the holding tank (11), it is not necessary and in some circumstances may even be preferable to locate some or all of them inside the holding tank (11). An example of locating some of the components of the controller internally is a pressure differential transmitter mounted within the chamber housing (30). The transmitter conveys information to the other major components of the controller that open the plunger (50) when the pressure within the chamber housing (30) exceeds the ambient environment pressure at the head end (52) by a predetermined amount.

The control lines (18a) and (18b) in the illustrated embodiment supply the actuator (80) with the pressurized fluid or gas from the controller (not shown) necessary for the actuator (80) to direct the plunger (50). In the event that an electrically operated actuator is utilized, the control line (18a) could be a conduit for electrical wiring, and without a need for another control line, only one control line would pass through the chamber housing (30). The pressurized gas line (16) conveys to the chamber housing (30) any gas suitable for the safe distribution to the chamber housing (30), the safe creation of at least one bubble underneath the accumulator (20) and the safe ascension through the ambient medium to the top of the holding tank. Preferably an inert gas is utilized but a gas composed of any elements or molecules will suffice.

Figure 3:
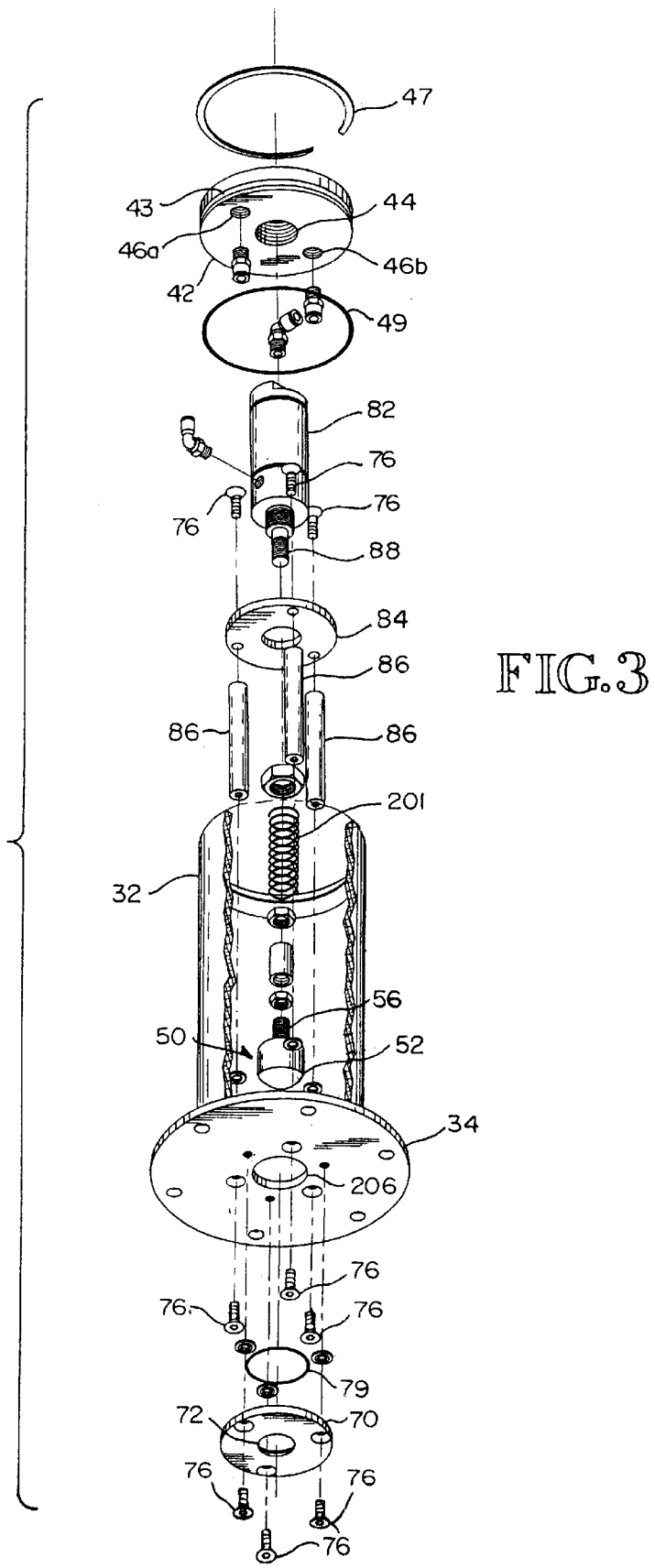
FIG. 3 is an exploded, perspective view of a preferred embodiment of the injector showing a chamber housing, a valve, an actuator, a fail-close mechanism, a base and an orifice plate.
Figure 4:
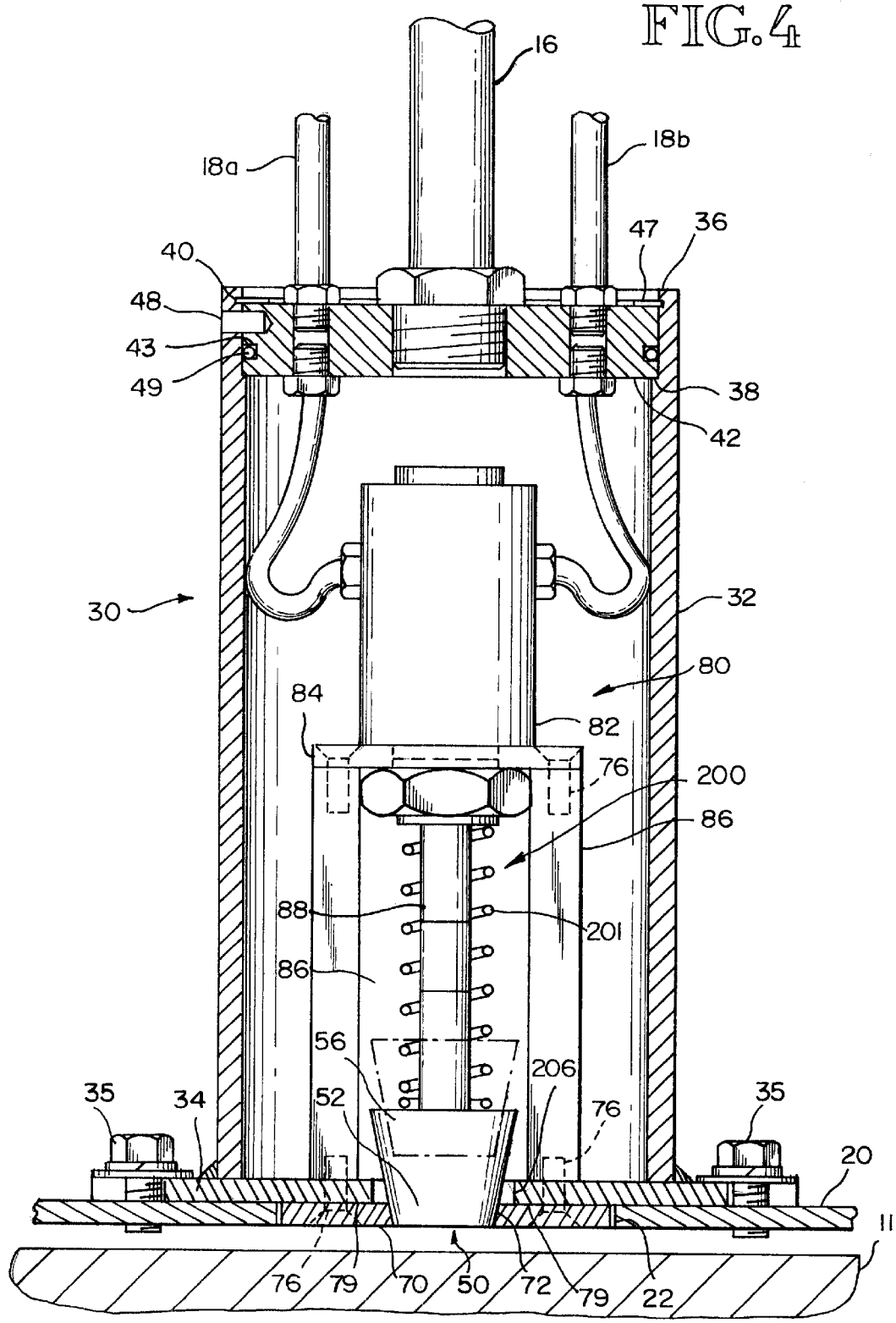
FIG. 4 is a cross sectional view of a preferred embodiment of the injector showing a chamber housing containing a valve connected to an actuator, a fail-close mechanism, a base, an accumulator and an orifice plate attached to the base.

Referring specifically to FIGS. 3 and 4, a detailed illustration of a preferred injector (12) is shown in conjunction with an accumulator (20) and comprises an orifice plate (70), a chamber housing (30), a plunger (50) and an actuator (80). As shown in FIGS. 3 and 4, the accumulator (20) has a first orifice (22) that can be any shape but for ease of manufacture and ideal bubble formation is preferably circular.

Fastened to the accumulator (20) opposite the bottom of the holding tank (11) is the chamber housing (30). The method of fastening may vary in the degree of permanence from welding to the method preferred and shown, anchor bolts (35).

As shown in FIGS. 3 and 4, the orifice plate (70) defines an aperture (72) and engages the plunger (50) when the plunger (50) is in a closed position. Attachment bolts (76) and a gasket (79) removably attach the orifice plate (70) to the base (34) of the chamber housing (30). With the orifice plate (70) removably attached to the base (34), the gasket (79) surrounds the aperture (72) of the orifice plate (70) and the chamber orifice (206) defined by the base (34) and engages both the orifice plate (70) and the base (34).

The orifice plate (70) does not have to be removably attached to the base (34) as is shown in FIGS. 3 and 4. Instead, with respect to other embodiments of the injector (12), the orifice plate (70) could be removably attached to the accumulator (20) with the gasket (79) engaging the accumulator (20) and the orifice plate (70). In addition, the orifice plate (70) could be removably attached to the base (34) while the gasket (79) engages the accumulator (20) and the orifice plate (70).

Also shown in FIGS. 3 and 4, the chamber housing (30) has a body (32), a base (34), an end (36), and a cap (42). The body (32) can have any shape or cross-section that permits access to and secured confinement of the pressurized gas, the plunger (50), the actuator (80) and the portions of the control lines (18a, 18b) terminating at the actuator (80). For ease of manufacturing and installation, the use of a cylinder with a circular cross-section is preferred.

The base (34) can either be welded to the body (32) or formed as an integral part of the body (32), and receives the anchor bolts (35) that fasten the chamber housing (30) to the accumulator (20). The end (36) removably retains the cap (42) with a shoulder (38) and a snap ring (47) that engages an inside annular groove (40). In this way the cap (42) is confidently secured to the body (32) while providing easy access to the components contained within the chamber housing (30).

To supply pressurized gas to the interior of the chamber housing (30) and to provide the control lines (18a) and (18b) access to the actuator (80), the cap (42) has a main port (44), and two control ports (46a, 46b). To help substantially confine the pressurized gas in the chamber housing, these ports are sealingly coupled to their appropriate lines and an O-ring (49), tightly fitted to an outside annular groove (43), is compressively engaged with the body (32). Completing the retention of the cap (42) to the body (32), an anti-rotation set screw (48) is threaded through the body (32) and into the cap (42) between the O-ring (49) and the snap ring (47).

Still referring to FIGS. 3 and 4, the plunger (50) comprises a head end (52) and a tail end (56). The tail end (56) is linked to the actuator (80) via a ram (88) thereby enabling the actuator (80) to reciprocate the plunger (50). The head end (52) engages the orifice plate (70) when the plunger (50) is in a closed position. With the head end (52) engaging the orifice plate (70), the holding tank's fluid is obstructed from entering the chamber housing (30). With other embodiments that do not comprise an orifice plate, the head end (52) engages either the base (34), as shown in FIGS. 5, 6, 7, 8 and 9, or the accumulator (20).

Also shown in FIGS. 3 and 4, the actuator (80) comprises a main body (82) and a ram (88), and is mounted to the chamber housing (30) with a plurality of struts (86) and a plate (84). The control lines (18a) and (18b) terminate at the main body (82) and provide the actuator (80) with the power to extend and retract the ram (88). Each strut (86) is fastened to the plate (84) and the base (34) by attachment bolts (76), and combined, they support the main body (82) and stabilize the actuator (80) during retraction and extension of the ram (88). The fastening can be by any common means such as rivets, bolts and nuts, adhesives or the like, either alone or in combination, that will provide sufficient support while the actuator (80) encounters varying dynamic loads during its operation. However, It is preferable that the actuator be fastened in such a way as to enable it to be easily removed during maintenance.

Still referring to FIGS. 3 and 4, the fail-close mechanism (200) simply comprises a spring (201) compressed between the tail end (56) of the plunger (50) and the main body (82) of the actuator (80). The spring (201) wraps around and is generally concentric with the ram (88) of the actuator (80).

Furthermore, the spring (201) is sized to always be in compression when located between the plunger (50) and the main body (82) of the actuator during the entire stroke of the ram (88). In this manner, the fail-close mechanism (200) will bias the plunger (50) to a closed position if the actuator becomes uncontrollable.

Figure 5:
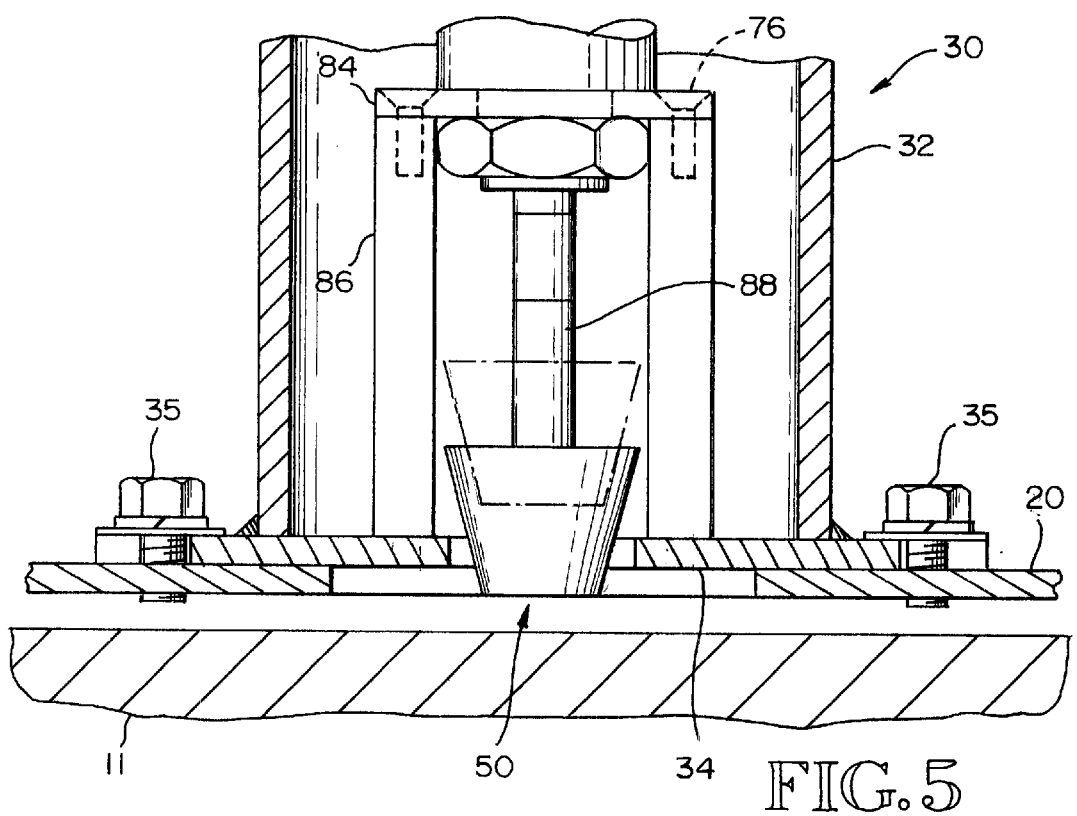
FIG. 5 is a partial, cross sectional view of another embodiment of the injector showing an accumulator, valve and base with out an orifice plate.

Turning now to FIG. 5, an alternative embodiment is shown that is similar to the embodiment shown in FIGS. 3 and 4 but does not utilize an orifice plate. Like the embodiment shown in FIGS. 3 and 4, the accumulator (20) is removably fastened to the base (34). However, as shown in FIG. 5, when the plunger (50) is in a closed position, the plunger (50) engages the base (34). Alternatively, the plunger (50) could engage the accumulator (20) instead of the base (34).

Figure 6:
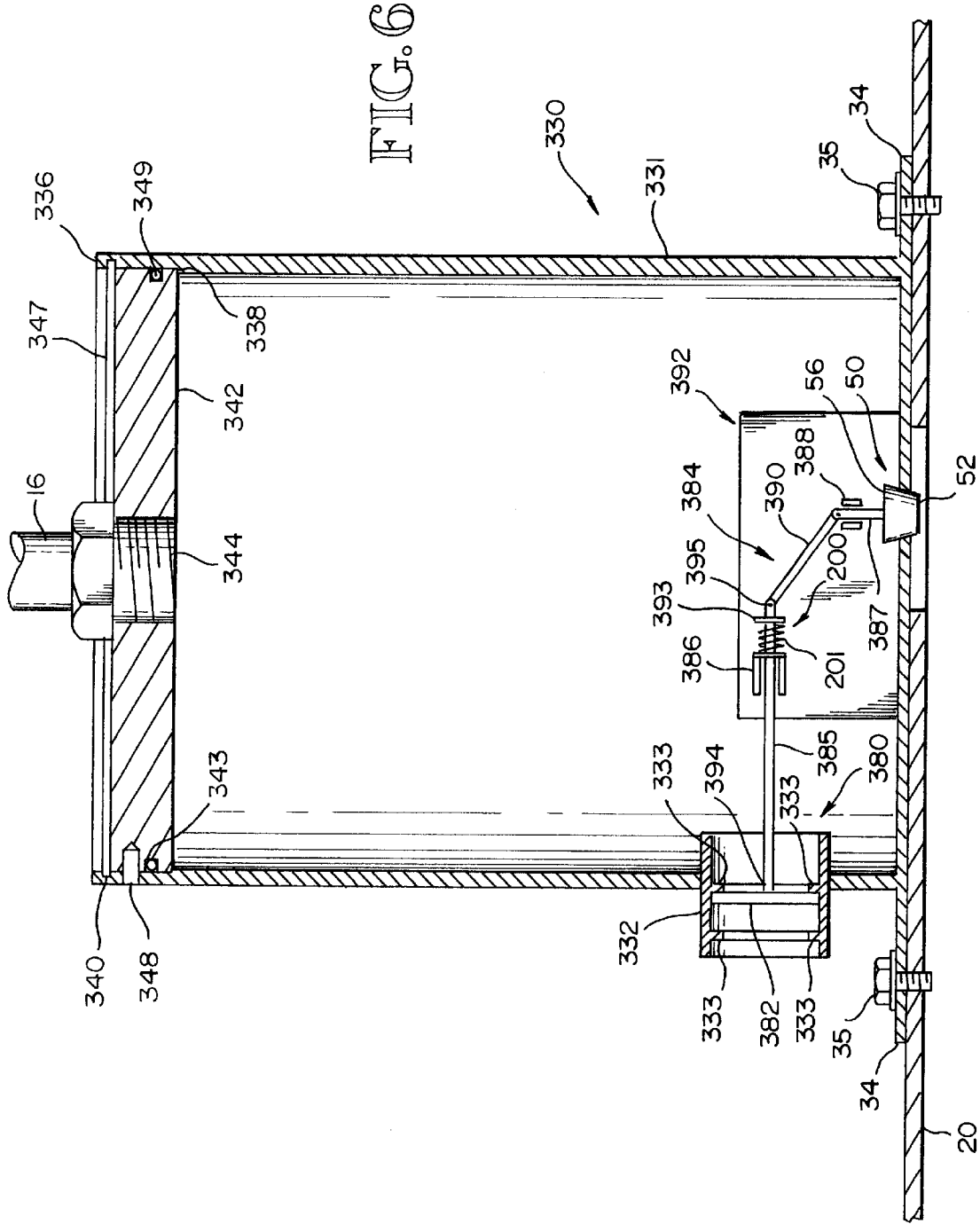
FIG. 6 is a schematic, cross sectional view of another embodiment of the injector showing a valve directed by an actuator that is operated by a difference in the pressure existing in the interior of the chamber housing and the pressure existing in the ambient environment.

Turning now to FIG. 6, another embodiment is shown utilizing a plunger (50) engaged with the base (34) and linked to an actuator (380) that is operated by a difference between the pressure in the interior of the chamber housing (330) and the pressure in the ambient environment. The previously described embodiment shown in FIGS. 3, 4 and 5 is very similar to the embodiment shown in FIG. 6 except for three general differences. First, the cap (342) of the chamber housing (330) only has a pressured gas line (16) terminating at the main port (344). Second, a support wall (392) comprising a piston guide (386) and a valve guide (388) substantially confines the movements of the piston link (385) and valve link (387) to one spatial dimension. Third, a portion of the body (331) comprises the actuator (380). Therefore, the following will describe only the unique structure of the embodiment utilizing the actuator (380) and refer to the remaining, previously defined, structure using the previously identified names and numbers.

As shown in FIG. 6, the chamber housing (330) has a body (331), a base (34), an end (336) and a cap (342). Located through a portion of the body (331) is a cylinder (332) with stops (333) located at the cylinder (332) to prevent excessive displacement of the piston (382). The body can otherwise have any shape or cross-section that permits access to and secured confinement of the pressurized gas, the plunger (50) and the actuator (380). For ease of manufacturing and installation, a cylinder with a circular cross-section is preferred.

The base (34) can either be welded to the body (331) or formed as an integral part of the body (331), and receives the anchor bolts (35) that fasten the chamber housing (330) to the accumulator (20). The end (336) removably retains the cap (342) with a shoulder (338) and a snap ring (347) engaging an inside annular groove (340). In this way the cap (342) is confidently secured to the body (331) while providing easy installation of and access to the components contained within the chamber housing (330).

To supply pressurized gas to the interior of the chamber housing (330), the cap (342) has a main port (344) that receives the pressurized gas line (16). To help substantially confine the pressurized gas in the chamber housing (330), the main port (344) is sealingly coupled to the pressurized gas line (16) and, an O-ring (349), tightly fitted to an outside annular groove (343), is compressively engaged with the body (331). Completing the retention of the cap (342) to the body (331), an anti-rotation set screw (348) is threaded through the body (331) and into the cap (342) between the O-ring (349) and the snap ring (347).

Still referring to FIG. 6, the actuator (380) comprises a piston (382), and a linkage (384) to transmit the displacement of the piston (382) to the plunger (50). The piston (382) is sized to slidingly engage the cylinder (332) of the chamber housing (330) while maintaining a substantially gas tight seal with the cylinder (332) at all times. The piston (382) is also sized to expose more surface area to the interior of the chamber housing (330) and the ambient environment than to the tail end (56) and head end (52) of the plunger (50), respectively. In this manner, a change in the pressure of the gas inside the chamber housing (330) will exert more force on the piston (382) than the plunger (50) thereby causing the plunger (50) to open or close.

Supported in the chamber housing (330) by a support wall (392), the linkage (384) comprises a piston link (385), a valve link (387), an intermediary link (390), a piston guide (386), a valve guide (388) and a fail-close mechanism (200). The piston link (385) is pivotally connected to the piston (382) at an end (394) and pivotally connected to the intermediary link (390) at its other end (395). Opposite the intermediary link's connection to the piston link (385), the intermediary link (390) is pivotally connected to the valve link (387). Likewise, opposite the valve link's connection to the intermediary link (390), the valve link (387) is pivotally connected to the tail end (56) of the plunger (50).

Still referring to FIG. 6, the fail-close mechanism (200) simply comprises a coil spring (201) compressed between the piston guide (386) and a retaining wall (393). The spring (201) wraps around and is generally concentric with the piston link (385). Located at the end (395) of the piston link (385), a retaining wall (393) is fastened to retain the spring (201) in compressive contact with the piston guide (386). The retaining wall (393) can be welded, bolted or screwed to the piston link (385) or it can be formed as an integral part of the piston link (385). In compressive contact with the retaining wall (393) and the piston guide (386), the spring (201) biases the plunger (50) to a closed position should the actuator (80) fail to maintain the plunger (50) in a closed position. The fail-close mechanism (200) also establishes a predetermined pressure difference used to trigger the operation of the actuator (380).

To substantially confine the motion of the piston link (385) to one spatial dimension, the piston link (385) slidingly engages the piston guide (386). Likewise, to substantially confine the motion of the valve link (387) to one spatial dimension, the valve link (387) slidingly engages the valve guide (388).

Still referring to FIG. 6, the piston guide (386) and valve guide (388) are fastened to the base (34) by the support wall (392). The preferred method of fastening the piston guide (386) and the valve guide (388) to the support wall (392) and fastening the support wall (388) to the base plate (34) is welding. However, nuts and bolts, rivets, adhesives and the like can also be used as long as the piston link (385) and the valve link (387) are sufficiently stabilized during the actuator's operation.

Figure 7:
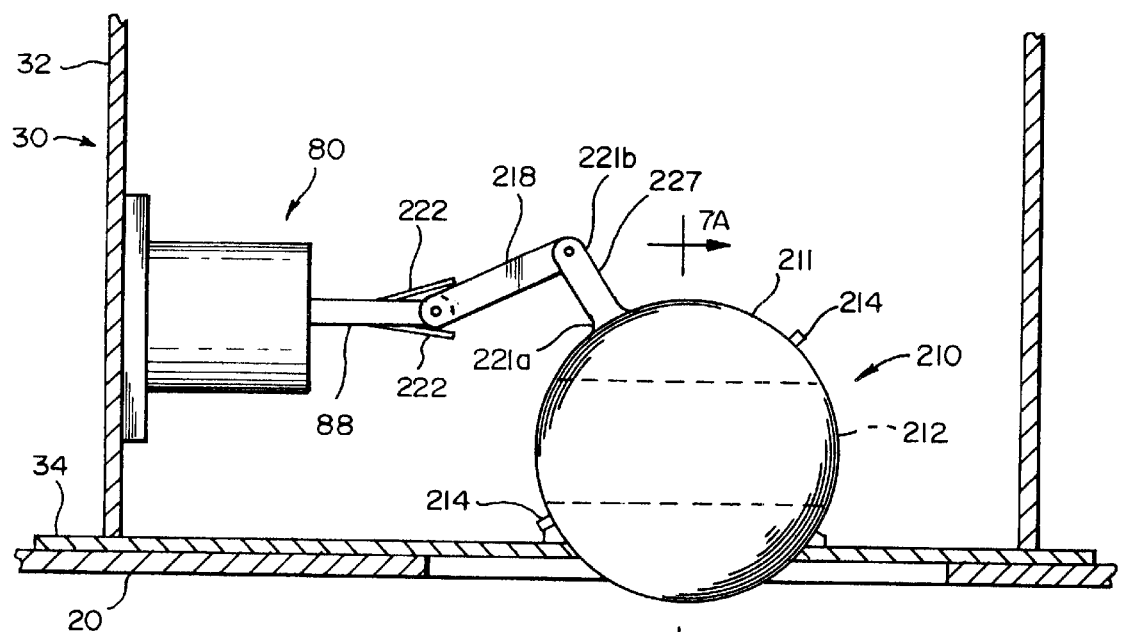
FIG. 7 is a partial, schematic, cross-sectional view of another embodiment of the injector showing a rotatable ball valve.
Figure 7A:
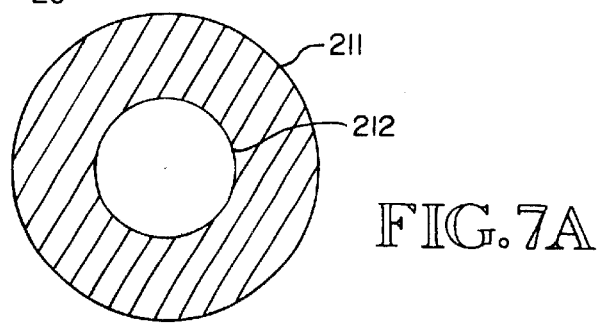
FIG. 7A is a schematic, cross sectional view of the rotatable ball valve showing a passage through it.

Turning now to FIGS. 7 and 7a, another embodiment of the injector is shown utilizing a ball valve (210) in combination with an actuator (80). The previously described embodiment shown in FIGS. 3, 4 and 5 is very similar to the embodiment shown in FIGS. 7 and 7a except for two general differences. First, a ball valve (210) is used to engage the base (34). Second, a fail-close mechanism is not utilized. Therefore, the following will describe only the unique structure of the embodiment utilizing the ball valve (210) and refer to the remaining, previously defined, structure using the previously identified names and numbers.

As shown in FIGS. 7 and 7a, the ball valve (210) comprises a ball (211) a passage (212) through the ball (211), stops (214), a swing link (218) and a crank arm (220). Throughout the cyclical opening and closing of the ball valve (210) by the actuator (80), the ball (211) engages the base (34).

To restrict the rotational displacement of the ball (211) during operation, stops (214) are fastened to the ball (211) and contact the base (34) at the desired maximum angular displacement of the ball (211). The stops (214) can be manufactured separately and subsequently fastened to the ball by bolts, screws or any adhesive sufficient to withstand the dynamic loading and jarring from the ball (211) as it ceases rotation. Alternatively, the stops (214) can be formed as an integral part of the ball (211).

Also fastened to the ball (211) is a crank arm (220) that is rigidly fastened at one end (221a) to the ball (211) and pivotally linked to the swing link (218) at the other end (221b). The crank arm (220) can either be welded, bolted or glued to the ball (211) or it can be formed as an integral part of the ball (211). The length of the crank arm (220) should be sufficient to permit the maximum desired rotational displacement with out the swing link (218) contacting the ball (211) thereby binding the valve mechanism. Opposite the connection of the crank arm (220) to the swing link (218), the swing link (218) is pivotally linked to the ram (88) of the actuator (80) and confined in its rotational displacement by two opposing retaining tongues (222) protruding from the ram (88). The retaining tongues (222) can be welded, bolted or screwed to the ram (88) or they can be formed as an integral part of the ram (88).

Turning now to FIGS. 8, 8a and 8b, another embodiment of the injector is shown utilizing a slide gate valve (230) in combination with an actuator (80). The previously described embodiment shown in FIGS. 3, 4 and 5 is very similar to the embodiment shown in FIGS. 8, 8a and 8b except for two general differences. First, a slide gate valve (230) is used to engage the base (34). Second, a fail-close mechanism is not utilized. Therefore, the following will describe only the unique structure of the embodiment utilizing the slide gate (230) and refer to the remaining, previously defined, structure using the previously identified names and numbers.

As shown in FIGS. 8, 8a and 8b, the slide gate valve (230) comprises a slide (232), an arm (234) and a retaining member (236). The arm (234) is linked to the ram (88) of the actuator (80) at one end (235a) and rigidly fastened to the slide (232) at its other end (235b). The arm (234) can either be welded, bolted or glued to the slide (232) or it can be formed as an integral part of the slide (232).

The slide (232) is fitted between the retaining member (236) and the base (34) of the chamber housing (30) so that the slide's movement, as directed by the actuator (80), is substantially confined to one spatial dimension.

The retaining member (236) further comprises a receiving end (238) wherein lies a bearing surface (240) that engages one end (233) of the slide (232) prior to the actuator (80) obtaining full extension. As the ram (88) of the actuator (80) reaches full extension, the bearing surface (240) directs the slide (232) to forcibly engage the base (34). The retaining member (236) is positioned at the chamber orifice (206) and can be fastened to the base (34) by screws, bolts and nuts, rivets or adhesive; or, as shown in FIGS. 8, 8a and 8b, the retaining member (236) can be integrally formed with the base (34).

Figure 9:
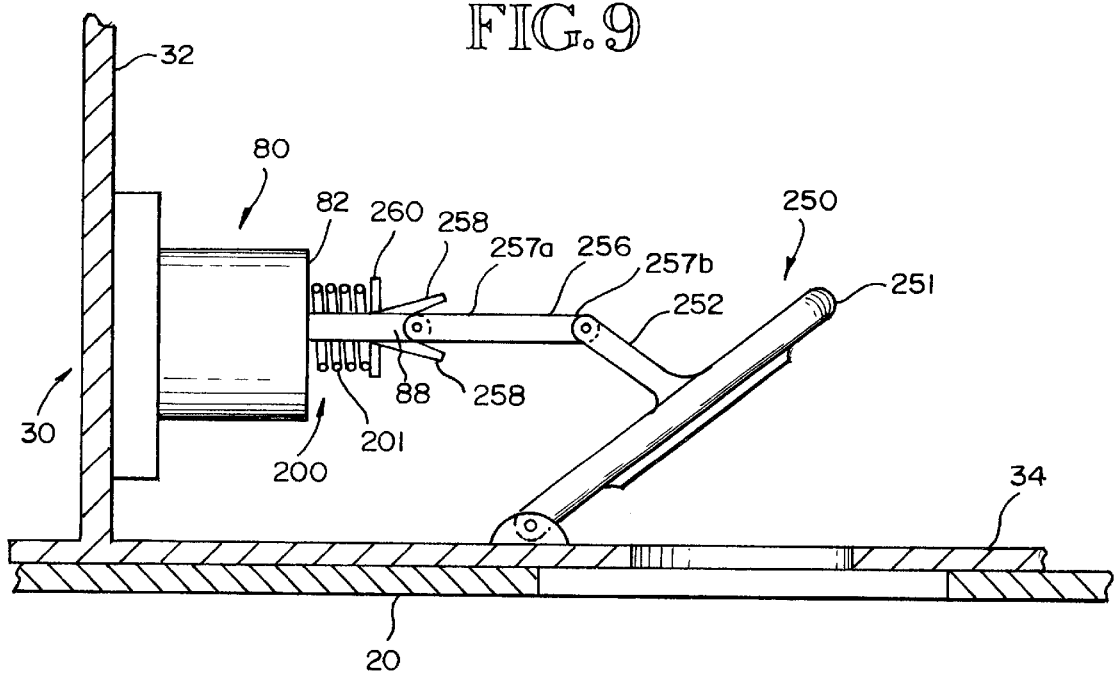
FIG. 9 is a partial, schematic, cross-sectional view of another embodiment of the injector showing a swing gate valve and fail-close mechanism.

Turning now to FIG. 9, an alternative embodiment of the injector is shown utilizing a swing gate valve (250) in combination with an actuator (80) and fail-close mechanism (200). The previously described embodiment shown in FIGS. 3, 4 and 5 is very similar to the embodiment shown in FIG. 9 except a swing gate valve (250) is used to engage the base (34). Therefore, the following will describe only the unique structure of the embodiment utilizing the swing gate valve (250) and refer to the remaining, previously defined, structure using the previously identified names and numbers.

As shown in FIG. 9, the swing gate valve (250) comprises an arm (252), a swing gate (251), a swing link (256), retaining tongues (258), a retaining wall (260) and a spring (201). The motion and linkage of the arm (252), swing link (256), retaining tongues (258) and ram (88) is very similar to the motion and linkage of the similar elements utilized in the ball valve (210) as shown in FIG. 7. One end (257a) of the swing link (256) is pivotally linked to the ram (88) of the actuator (80) and, during its operation, is substantially confined in the degree of its rotational displacement by two opposing retaining tongues (258) protruding from the ram (88). Likewise, the other end (257b) of the swing link (256) is pivotally linked to the arm (252).

The spring (201) wraps around and is concentric with the ram (88) of the actuator (80). Where the retaining tongues (258) emerge from the ram (88), a retaining wall (260) is located on and fastened to the ram (88) to retain the spring (201) in compressive contact with the main body (82) of the actuator (80). The retaining wall (260) and retaining tongues (258) can be welded, bolted or screwed to the ram (88) or they can be formed as an integral part of the ram (88). In compressive contact with the retaining wall (260) and main body (82), the spring (201) biases the swing gate valve (250) to a closed position should the actuator (80) fail to maintain the swing gate valve (250) in a closed position.

The swing gate (251) is rigidly fastened to the arm (252) and pivotally linked to the base (34) of the chamber housing (30) such that when the swing gate valve (250) is in a closed position the swing gate (251) engages the base (34). The arm (252) can be welded, bolted or screwed to the swing gate (251) or it can be formed as an integral part of the swing gate (251).

Although the present injector has been described in considerable detail with reference to certain preferred embodiments thereof, other embodiments are possible. Therefore the spirit and scope of the appended claims should not be limited to the description of the preferred embodiments contained herein.

What is claimed:

1. A method for mixing and blending fluids and other materials in a container having side and bottom walls comprising:
   a) locating in the container one or more injectors each defining a chamber;
   b) presenting pressurized gas to the one or more chambers;
   c) establishing a conduit between the chamber and the fluids and other materials in the container;
   d) opening the conduit to release the pressurized gas into the container; and
   e) forming a bubble against an accumulator with the expelled gas.

2. An improved apparatus for gas induced mixing and blending fluids and other materials comprising:
   a chamber housing defining a chamber for receiving pressurized gas from an external source through a port defined by the chamber housing and for expelling pressurized gas through a chamber orifice defined by a base;

a remotely operable valve disposed in the chamber for selectively administering or obstructing the release of pressurized gas through the one or more chamber orifices; and an accumulator operable to form a bubble from the gas expelled from the chamber housing.

3. The improved apparatus of claim 2, further comprising an actuator operatively coupled to a controller and having an end operatively linked to the valve to control operation thereof.

4. The improved apparatus of claim 3 wherein the actuator is disposed in the chamber.

5. The improved apparatus of claim 3 wherein the actuator is hydraulically operated.

6. The improved apparatus of claim 3 wherein the actuator is pneumatically operated.

7. The improved apparatus of claim 3 wherein the actuator is electrically operated.

8. The improved apparatus of claim 2, further comprising a fail-close mechanism operatively connected to the valve for biasing the one or more valves in a closed position.

9. The improved apparatus of claim 2, further comprising an orifice plate defining an aperture and being attached to the base and positioned with respect to the base to engage at least a portion of the valve.

10. The improved apparatus of claim 9 wherein the orifice plate is removably attached to the base.

11. The improved apparatus of claim 9 wherein the orifice plate is removably attached to the accumulator.

12. The improved apparatus of claim 9, wherein the valve comprises a plunger having a head end to engage the orifice plate when the valve is in a closed position.

13. The improved apparatus of claim 9, wherein the valve comprises a ball defining a passage and an axis of rotation, the ball slidingly engaging the orifice plate and being positioned with respect to the orifice plate to obstruct the expulsion of pressurized gas when the ball is rotated about the axis of rotation to a closed position and to administer the expulsion of pressurized gas through the passage when the ball is rotated about the axis of rotation to an open position.

14. The improved apparatus of claim 9, wherein the valve comprises a swing gate defining an axis of rotation and being positioned with respect to the orifice plate to obstruct the expulsion of pressurized gas when the swing gate is pivoted about the axis of rotation to engage the orifice plate and to administer the expulsion of pressurized gas when the swing gate is pivoted about the axis of rotation to disengage the orifice plate.

15. The improved apparatus of claim 9, wherein the valve comprises a slide gate slidingly engaging the orifice plate and being positioned with respect to the orifice plate to obstruct the expulsion of pressurized gas when the slide gate is moved to a closed position and to administer the expulsion of pressurized gas when the slide gate is moved to an open position.

16. The improved apparatus of claim 2, wherein the valve comprises a plunger having a head end to engage the base when the valve is in a closed position.

17. The improved apparatus of claim 2, wherein the valve comprises a plunger having a head end to engage the accumulator when the valve is in a closed position.

18. The improved apparatus of claim 2, wherein the valve comprises a ball defining a passage and an axis of rotation, the ball slidingly engaging the base and being positioned with respect to the base to obstruct the expulsion of pressurized gas when the ball is rotated about the axis of rotation to a closed position and to administer the expulsion of pressurized gas through the passage when the ball is rotated about the axis of rotation to an open position.

19. The improved apparatus of claim 2, wherein the valve comprises a ball defining a passage and an axis of rotation, the ball slidingly engaging the accumulator and being positioned with respect to the accumulator to obstruct the expulsion of pressurized gas when the ball is rotated about the axis of rotation to a closed position and to administer the expulsion of pressurized gas through the passage when the ball is rotated about the axis of rotation to an open position.

20. The improved apparatus of claim 2, wherein the valve comprises a swing gate defining an axis of rotation and being positioned with respect to the base to obstruct the expulsion of pressurized gas when the swing gate is pivoted about the axis of rotation to engage the base and to administer the expulsion of pressurized gas when the swing gate is pivoted about the axis of rotation to disengage the base.

21. The improved apparatus of claim 2, wherein the valve comprises a swing gate defining an axis of rotation and being positioned with respect to the accumulator to obstruct the expulsion of pressurized gas when the swing gate is pivoted about the axis of rotation to engage the accumulator and to administer the expulsion of pressurized gas when the swing gate is pivoted about the axis of rotation to disengage the accumulator.

22. The improved apparatus of claim 2, wherein the valve comprises a slide gate slidingly engaging the base and being positioned with respect to the base to obstruct the expulsion of pressurized gas when the slide gate is moved to a closed position and to administer the expulsion of pressurized gas when the slide gate is moved to an open position.

23. The improved apparatus of claim 2, wherein the valve comprises a slide gate slidingly engaging the accumulator and being positioned with respect to the accumulator to obstruct the expulsion of pressurized gas when the slide gate is moved to a closed position and to administer the expulsion of pressurized gas when the slide gate is moved to an open position.

24. The improved apparatus of claim 2 wherein the accumulator is mounted to the base of the chamber housing.

25. The improved apparatus of claim 2 wherein the accumulator defines an orifice and is mounted to the base of the chamber housing such that gas expelled from the chamber housing passes through the orifice.

26. An improved apparatus for gas induced mixing and blending fluids and other materials comprising:

one or more external sources of pressurized gas;

one or more injectors disposed in the container comprising:

a chamber housing defining a chamber for receiving pressurized gas from the one or more external sources through a port defined by the chamber housing and for expelling pressurized gas through a chamber orifice defined by a base; and a remotely operable valve disposed in the chamber for selectively administering or obstructing the release of pressurized gas through the chamber orifice;

one or more accumulators disposed in the container and each operable to form a bubble from the gas expelled from a chamber housing; and one or more conduits fluidly connecting the one or more injectors to the one or more external sources of pressurized gas.

27. The improved apparatus of claim 26, further comprising an actuator operatively coupled to a controller and having an end operatively linked to the valve to control operation thereof.

28. The improved apparatus of claim 27 wherein the actuator is disposed in the chamber.

29. The improved apparatus of claim 27 wherein the actuator is hydraulically operated.

30. The improved apparatus of claim 27 wherein the actuator is pneumatically operated.

31. The improved apparatus of claim 27 wherein the actuator is electrically operated.

32. The improved apparatus of claim 26 further comprising a fail-close mechanism operatively connected to the valve for biasing the valve in a closed position.

33. The improved apparatus of claim 26 further comprising an orifice plate defining an aperture and being attached to the base and positioned with respect to the base to engage at least a portion of the valve.

34. The improved apparatus of claim 33 wherein the orifice plate is removably attached to the base.

35. The improved apparatus of claim 33 wherein the orifice plate is removably attached to the accumulator.

36. The improved apparatus of claim 33, wherein the valve comprises a plunger having a head end to engage the orifice plate when the valve is in a closed position.

37. The improved apparatus of claim 33, wherein the valve comprises a ball defining a passage and an axis of rotation, the ball slidingly engaging the orifice plate and being positioned with respect to the orifice plate to obstruct the expulsion of pressurized gas when the ball is rotated about the axis of rotation to a closed position and to administer the expulsion of pressurized gas through the passage when the ball is rotated about the axis of rotation to an open position.

38. The improved apparatus of claim 33, wherein the valve comprises a swing gate defining an axis of rotation and being positioned with respect to the orifice plate to obstruct the expulsion of pressurized gas when the swing gate is pivoted about the axis of rotation to engage the orifice plate and to administer the expulsion of pressurized gas when the swing gate is pivoted about the axis of rotation to disengage the orifice plate.

39. The improved apparatus of claim 33, wherein the valve comprises a slide gate slidingly engaging the orifice plate and being positioned with respect to the orifice plate to obstruct the expulsion of pressurized gas when the slide gate is moved to a closed position and to administer the expulsion of pressurized gas when the slide gate is moved to an open position.

40. The improved apparatus of claim 26, wherein the valve comprises a plunger having a head end to engage the base when the valve is in a closed position.

41. The improved apparatus of claim 26, wherein the valve comprises a plunger having a head end to engage the accumulator when the valve is in a closed position.

42. The improved apparatus of claim 26, wherein the valve comprises a ball defining a passage and an axis of rotation, the ball slidingly engaging the base and being positioned with respect to the base to obstruct the expulsion of pressurized gas when the ball is rotated about the axis of rotation to a closed position and to administer the expulsion of pressurized gas through the passage when the ball is rotated about the axis of rotation to an open position.

43. The improved apparatus of claim 26, wherein the valve comprises a ball defining a passage and an axis of rotation, the ball slidingly engaging the accumulator and being positioned with respect to the accumulator to obstruct the expulsion of pressurized gas when the ball is rotated about the axis of rotation to a closed position and to administer the expulsion of pressurized gas through the passage when the ball is rotated about the axis of rotation to an open position.

44. The improved apparatus of claim 26, wherein the valve comprises a swing gate defining an axis of rotation and being positioned with respect to the base to obstruct the expulsion of pressurized gas when the swing gate is pivoted about the axis of rotation to engage the base and to administer the expulsion of pressurized gas when the swing gate is rotated about the axis of rotation to disengage the base.

45. The improved apparatus of claim 26, wherein the valve comprises a swing gate defining an axis of rotation and being positioned with respect to the accumulator to obstruct the expulsion of pressurized gas when the swing gate is pivoted about the axis of rotation to engage the accumulator and to administer the expulsion of pressurized gas when the swing gate is pivoted about the axis of rotation to disengage the accumulator.

46. The improved apparatus of claim 26, wherein the valve comprises a slide gate slidingly engaging the base and being positioned with respect to the base to obstruct the expulsion of pressurized gas when the slide gate is moved to a closed position and to administer the expulsion of pressurized gas when the slide gate is moved to an open position.

47. The improved apparatus of claim 26, wherein the valve comprises a slide gate slidingly engaging the accumulator and being positioned with respect to the accumulator to obstruct the expulsion of pressurized gas when the slide gate is moved to a closed position and to administer the expulsion of pressurized gas when the slide gate is moved to an open position.

* * * * *